United States Patent
Kim et al.

(10) Patent No.: US 10,061,145 B2
(45) Date of Patent: Aug. 28, 2018

(54) LIQUID CRYSTAL DISPLAY DEVICE

(71) Applicant: Samsung Display Co. Ltd., Yongin-si, Gyeonggi-do (KR)

(72) Inventors: Si Heun Kim, Hwaseong-si (KR); Soon Joon Rho, Hwaseong-si (KR); Jong Ho Son, Seoul (KR); Kyung Hae Park, Seongnam-si (KR); Joon Hyung Park, Seoul (KR); Beom Soo Shin, Hwaseong-si (KR); Hye Lim Jang, Hwaseong-si (KR); Kang Seob Jeong, Seongnam-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 8 days.

(21) Appl. No.: 15/356,964

(22) Filed: Nov. 21, 2016

(65) Prior Publication Data
US 2017/0261791 A1    Sep. 14, 2017

(30) Foreign Application Priority Data
Mar. 8, 2016    (KR) .................. 10-2016-0027524

(51) Int. Cl.
G02F 1/1333    (2006.01)
G02F 1/133     (2006.01)
(Continued)

(52) U.S. Cl.
CPC ...... G02F 1/13306 (2013.01); C09K 19/3098 (2013.01); C09K 19/56 (2013.01);
(Continued)

(58) Field of Classification Search
CPC .... C09K 19/3098; C09K 19/56; C09K 19/60; C09K 19/601; C09K 19/603; C09K 2019/0448; C09K 2019/122; C09K 2019/123; C09K 2019/3004; C09K 2019/301; C09K 2019/3016; C09K 2019/3027; C09K 2019/523; G02F 1/1333; G02F 1/13306; G02F 1/133512; G02F 1/133514; G02F 1/133723; G02F 1/13394;
(Continued)

(56) References Cited

U.S. PATENT DOCUMENTS 7,105,209 B2    9/2006 Heckmeier et al.
7,731,865 B2    6/2010 Bernatz et al.
(Continued)

FOREIGN PATENT DOCUMENTS

KR    10-2012-0014749 A    2/2012
KR    10-2013-0110172 A    10/2013
KR    10-2014-0098402 A    8/2014

OTHER PUBLICATIONS

Extended Search Report dated Mar. 24, 2017, issued by the European Patent Office for European Patent Application No. 16196827-1914.6.
(Continued)

*Primary Examiner* — Geraldina Visconti
(74) *Attorney, Agent, or Firm* — Cantor Colburn LLP (57) ABSTRACT

A liquid crystal display device, including: a display substrate including a first base substrate, a switching device disposed on the first base substrate, a color filter layer disposed on the switching device, and a first electrode disposed on the color filter layer; a counter display substrate including a second base substrate and a second electrode disposed on the second base substrate and facing the first electrode, wherein the counter display substrate is disposed separately from and facing the display substrate; a liquid crystal layer disposed between the display substrate and the counter display substrate, wherein the liquid crystal layer includes at least one first liquid crystal compound represented by Formula 1 and at least one second liquid crystal compound represented by Formula 2; and a light-shielding spacer disposed between the display substrate and the counter display substrate and maintaining a thickness of the liquid crystal layer:

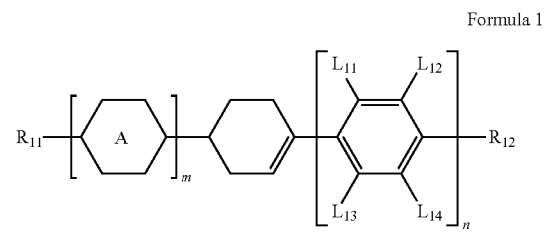

Formula 1

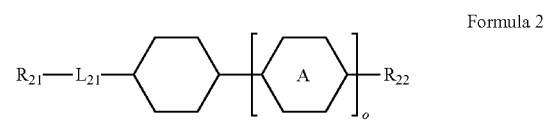

Formula 2 wherein in Formula 1 and Formula 2, each of $R_{11}$—*,

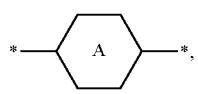

$R_{12}$—*, $L_{11}$-*, $L_{12}$-*, $L_{13}$-*, $L_{14}$-*, $R_{21}$—*, *-$L_{21}$-*, m, n, i, j, o is same as defined in the specification.

15 Claims, 4 Drawing Sheets

(51) Int. Cl.
| | |
|---|---|
| *C09K 19/30* | (2006.01) |
| *C09K 19/56* | (2006.01) |
| *C09K 19/60* | (2006.01) |
| *G02F 1/1335* | (2006.01) |
| *G02F 1/1337* | (2006.01) |
| *G02F 1/1339* | (2006.01) |
| *G02F 1/1343* | (2006.01) |
| *G02F 1/1368* | (2006.01) |
| *G02F 1/139* | (2006.01) |
| *G02F 1/00* | (2006.01) |
| G02F 1/1362 | (2006.01) |
| C09K 19/04 | (2006.01) |
| C09K 19/12 | (2006.01) |
| C09K 19/52 | (2006.01) |
| G02F 1/137 | (2006.01) |

(52) U.S. Cl.
CPC ............ *C09K 19/60* (2013.01); *C09K 19/601* (2013.01); *C09K 19/603* (2013.01); *G02F 1/0045* (2013.01); *G02F 1/1339* (2013.01); *G02F 1/1368* (2013.01); *G02F 1/1393* (2013.01); *G02F 1/13394* (2013.01); *G02F 1/133512* (2013.01); *G02F 1/133514* (2013.01); *G02F 1/133723* (2013.01); *G02F 1/134336* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3016* (2013.01); *C09K 2019/3027* (2013.01); *C09K 2019/523* (2013.01); *G02F 1/13439* (2013.01); *G02F 1/136286* (2013.01); *G02F 2001/13398* (2013.01); *G02F 2001/13712* (2013.01); *G02F 2001/13775* (2013.01); *G02F 2001/133726* (2013.01); *G02F 2201/121* (2013.01); *G02F 2201/123* (2013.01)

(58) Field of Classification Search
CPC ........... G02F 1/134336; G02F 1/13439; G02F 1/136286; G02F 1/1368; G02F 1/1339; G02F 1/1393; G02F 1/0045; G02F 2001/133726; G02F 2001/13398; G02F 2001/13712; G02F 2001/13775; G02F 2201/121; G02F 2201/123
USPC ....................................... 252/299.01; 428/1.1
See application file for complete search history.

(56) References Cited

U.S. PATENT DOCUMENTS

| | | | |
|---|---|---|---|
| 8,361,570 | B2 | 1/2013 | Usui et al. |
| 8,735,511 | B2 | 5/2014 | Shinano et al. |
| 2011/0180798 | A1 | 7/2011 | Shim et al. |
| 2012/0287380 | A1 | 11/2012 | Hagiwara et al. |
| 2013/0183460 | A1 | 7/2013 | Klasen-Memmer et al. |
| 2015/0277224 | A1 | 10/2015 | Yu et al. |
| 2015/0299574 | A1 | 10/2015 | Hirschmann et al. |
| 2016/0032189 | A1 | 2/2016 | Baron et al. |
| 2016/0054602 | A1 | 2/2016 | Tong et al. |

OTHER PUBLICATIONS

European Search Report dated Jan. 2, 2017, issued by the European Patent Office for European Patent Application No. 16196827.6-1904 filed Nov. 2, 2016.

LIQUID CRYSTAL DISPLAY DEVICE

This application claims priority to Korean Patent Application No. 10-2016-0027524 filed on Mar. 8, 2016, and all the benefits accruing therefrom under 35 U.S.C. § 119, the content of which is incorporated herein in its entirety by reference.

BACKGROUND

1. Field

The present disclosure relates to a liquid crystal display device (LCD).

2. Description of the Related Art

A display device is a device for visually displaying data. As the "information society" continues to develop, the demand for a display device for displaying an image has increased and diversified. Examples of the display device include a liquid crystal display device (LCD), a plasma display panel (PDP), an organic light-emitting diode (OLED) display device, and the like.

The LCD device, which is one of the most widely-used display devices, includes a display substrate, a counter display substrate, a liquid crystal layer, which is disposed between the display substrate and the counter display substrate, and a backlight unit.

As the field of application of the LCD device has expanded, improvements in the properties of the LCD device, such as improved response speed, improved contrast, and a lowered driving voltage, have been increasingly in demand. To improve the properties of the LCD device, a liquid crystal compound contained in a liquid crystal composition of the liquid crystal layer is required to have low rotational viscosity, high chemical/physical stability, a high liquid crystal phase-isotropic phase transition temperature, a low liquid crystal phase lower limit temperature, and a proper modulus of elasticity. For a high-speed response characteristic, in particular, a liquid crystal material having low rotational viscosity is needed.

SUMMARY

Exemplary embodiments of the present disclosure provide a liquid crystal display device (LCD) having a high voltage holding ratio (VHR) and a high-speed response characteristic.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment, there is provided a liquid crystal display device.

The liquid crystal display device includes:
a display substrate including a first base substrate, a switching device disposed on the first base substrate, a color filter layer disposed on the switching device, and a first electrode disposed on the color filter layer,
a counter display substrate including a second base substrate and a second electrode disposed on the second base substrate and facing the first electrode, wherein the counter display substrate is disposed separately from and facing the display substrate,
a liquid crystal layer disposed between the display substrate and the counter display substrate, wherein the liquid crystal layer includes at least one first liquid crystal compound represented by Formula 1 and at least one second liquid crystal compound represented by Formula 2, and
a light-shielding spacer disposed between the display substrate and the counter display substrate and maintaining a thickness of the liquid crystal layer:

Formula 1

Formula 2 wherein in Formula 1 and Formula 2, is a 1,4-phenylene group or a 1,4-cyclohexylene group, and
each of $R_{11}$—* and $R_{22}$—* is independently $C_{1\text{-}10}$ alkyl group-*,
wherein in Formula 1,
each of $L_{11}$-*, $L_{12}$-*, $L_{13}$-*, and $L_{14}$-* is independently *—F, *—$CF_3$, or *—H,
$R_{12}$—* is a *—$C_{1\text{-}5}$ alkoxy group, *—$OCF_3$, *—$CF_3$, or *—F,
each of m and n is independently an integer from 1 to 2,
wherein in Formula 2,
$R_{21}$—* is $C_{1\text{-}5}$ alkyl group-*,
*-$L_{21}$-* is *—$(CH_2)_i$—CH=CH—$(CH_2)_j$—*, wherein each of i and j of is independently an integer from 0 to 2, and
o is an integer from 1 to 2.

The liquid crystal layer may not include at least one third liquid crystal compound represented by Formula 3:

$$CH_2=CH-(CH_2)_r\text{-}(Cyc)_s\text{-}(PheF_2)_t-R_{31}$$  Formula 3 wherein in Formula 3,
*-Cyc-* is a 1,4-cyclohexylene group,
*-$PheF_2$—* is a 2,3-fluoro-1,4-phenylene group,
r is an integer from 0 to 5,
each of s and t are integers from 0 to 3,
the sum of s and t is an integer from 2 to 4, and
*—$R_{31}$ is a *—$C_{1\text{-}5}$ alkyl group or a *—$C_{1\text{-}5}$ alkoxy group.

The liquid crystal layer may further include reactive mesogens represented by Formula RM:

P1-SP1-MG-SP2-P2  Formula RM wherein in Formula RM,
each of P1-* and P2-* is independently

,

*—SP1-* is *—(L-Z-L-Ar)ₐL-*, wherein a is an integer from 0 to 2,

*—PS2-* is *-L-(Ar-L-Z-L)ᵦ*, wherein b is an integer from 0 to 2,

*-L-* is *—(CH₂)_c—*, *—O(CH₂)_c—*,

*—CH=CH—*,
or *—C≡C—*,

*-Z-* is *—(CH₂)_c—*, wherein c is an integer from 0 to 12,

*—Ar—* is

*-MG-* is and

A-* is H—*, $C_{1-10}$ alkyl-*, F—*, Br—*, I—*, *—OH, *—NH₂, or CN—*.

The liquid crystal display device may further include:
a first liquid crystal alignment layer disposed between the first electrode and the liquid crystal layer, and
a second liquid crystal alignment layer disposed between the second electrode and the liquid crystal layer,
wherein at least one of the first liquid crystal alignment layer and the second liquid crystal alignment layer may include polymers of the reactive mesogens.

A content of the at least one first liquid crystal compound in a liquid crystal composition may be about 0.5 weight percent to about 15 weight percent.

The content of the at least one second liquid crystal compound in the liquid crystal composition may be about 1 weight percent to about 30 weight percent.

The light-shielding spacer may have an area of overlap with the switching device.

The light-shielding spacer may have an optical density of 1 or greater per film thickness of 1 micrometer at a wavelength of about 200 nanometers to about 800 nanometers.

The light-shielding spacer may include a light-shielding material and a binder.

According to the exemplary embodiments, a liquid crystal display device having a high VHR and a high-speed response characteristic can be provided.

Other features and aspects will be apparent from the following detailed description, the drawings, and the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Features of the present inventive concept and methods of accomplishing the same may be understood more readily by reference to the following detailed description of preferred embodiments and the accompanying drawings.

The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The term "$C_{A\text{-}B}$", as used herein, may denote a carbon number of A to B. Also, the symbol "*", as used herein, denotes a binding site.

As used herein, the term "alkyl group" refers to a group derived from a straight or branched chain saturated aliphatic hydrocarbon having the specified number of carbon atoms and having a valence of at least one.

As used herein, the term "alkoxy group" refers to "alkyl-O—", wherein the term "alkyl" has the same meaning as described above.

As used herein, the term "alkylene group" refers to a straight or branched saturated aliphatic hydrocarbon group having a valence of at least two, optionally substituted with one or more substituents where indicated, provided that the valence of the alkylene group is not exceeded.

Figure 1:
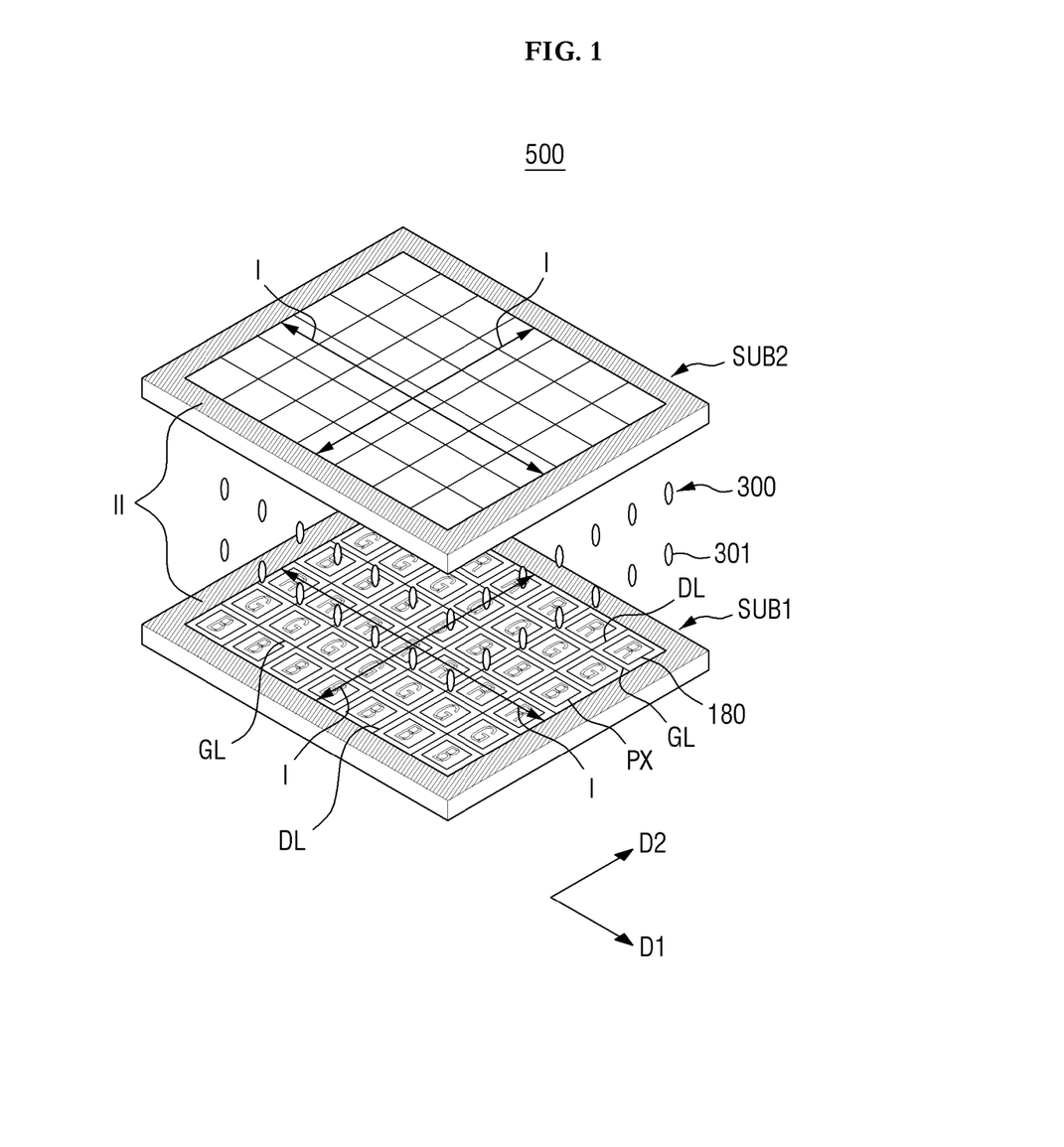
FIG. 1 is a schematic exploded perspective view illustrating a display substrate and a counter display substrate of a liquid crystal display device (LCD) according to an exemplary embodiment of the present disclosure.
Figure 2:
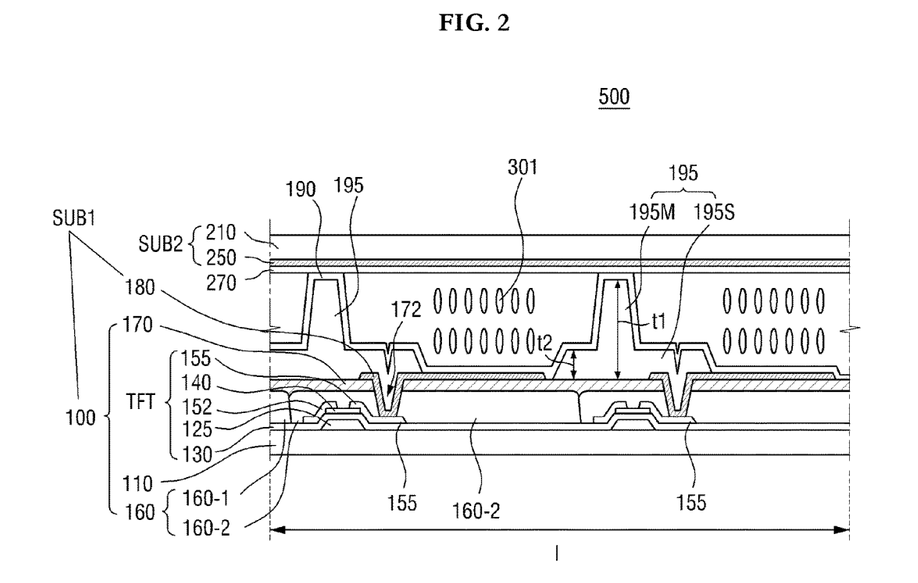
FIG. 2 is a schematic partial cross-sectional view illustrating a display area of the LCD device of FIG. 1.

FIG. 1 is a schematic exploded perspective view illustrating a display substrate SUB1 and a counter display substrate SUB2 of a liquid crystal display device (LCD) device 500 according to an exemplary embodiment of the present disclosure, and FIG. 2 is a schematic partial cross-sectional view illustrating a display area I of the LCD device 500 of FIG. 1.

Referring to FIG. 1, the LCD device 500 includes the display substrate SUB1, the counter display substrate SUB2, which is isolated from, and faces, the display substrate SUB1 while maintaining a predetermined gap with the display substrate SUB1, and a liquid crystal layer 300, which is interposed between the display substrate SUB1 and the counter display substrate SUB2. The liquid crystal layer 300 includes liquid crystal compounds 301 and has negative dielectric anisotropy.

The LCD 500 has a display area I and a non-display area II. The display area I is an area in which an image is viewed, and the non-display area II is an area which is the periphery of the display area I surrounding the display area I and in which no image is viewed.

The display substrate SUB1 may include a plurality of gate lines GL, which extend in a first direction D1, and a plurality of data lines DL, which extend in a second direction D2 that is perpendicular to the first direction D1. Although not specifically illustrated in FIGS. 1 and 2, the gate lines GL may not necessarily be disposed only in the display area I and may even extend into the non-display area II, in which case, the display substrate SUB1 may include gate pads (not illustrated). In other words, the display substrate SUB1 may include the gate pads in the non-display area II. Although not specifically illustrated in FIGS. 1 and 2, the data lines DL may not necessarily be disposed only in the display area I and may even extend into the non-display area II, in which case, the display substrate SUB1 may include data pads (not illustrated). In other words, the display substrate SUB1 may include the data pads in the non-display area II.

In the display area I, a plurality of pixels PX, which are defined by the gate lines GL and the data lines DL, may be disposed. The pixels PX may be arranged in a matrix form, and pixel electrodes 180 may be disposed in the pixels PX, respectively. In other words, the display substrate SUB1 may include the pixels PX, which are arranged in a matrix form, and the pixel electrodes 180, which are also arranged in a matrix form, in the display area I.

In the non-display area II, a driving unit (not illustrated), which provides gate driving signals and data driving signals to the pixels PX, may be disposed. In other words, the display substrate SUB1 may include the driving units in the non-display area II. The driving unit may generate gate driving signals and data driving signals corresponding to a driving frequency of 120 Hz or higher.

The display substrate SUB1 may include a switching device array substrate (not illustrated) and the pixel electrodes 180, and the counter display substrate SUB2 may include a second base substrate (not illustrated) and a common electrode (not illustrated). The display substrate SUB1, the counter display substrate SUB2, and the liquid crystal layer 300 will hereinafter be described in further detail with reference to FIGS. 1 and 2.

Referring to FIGS. 1 and 2, the display substrate SUB1 may include a switching device array substrate 100 and the pixel electrodes 180. For example, the switching device array substrate 100 may include a first base substrate 110, switching devices TFTs, which are disposed on the first base substrate 110, a color filter layer 160, which is disposed on the switching devices TFT, and an organic layer 170, which is disposed on the color filter layer 160.

The counter display substrate SUB2, which is an opposite substrate to the display substrate SUB1, includes a second base substrate 210 and a common electrode 250.

The LCD 500 may further include light-shielding spacers 195, a first liquid crystal alignment layer 190, and a second liquid crystal alignment layer 270. The light-shielding spacers 195 may serve both as spacers for maintaining the thickness of the liquid crystal layer 300 and as black matrices. The light-shielding spacers 195 may be disposed on the display substrate SUB1. The light-shielding spacers 195 may have areas of overlap with the switching devices TFTs. The first liquid crystal alignment layer 190 may be disposed on the light-shielding spacers 195 and on the display substrate SUB1. The second liquid crystal alignment layer 270 may be disposed on the counter display substrate SUB2. For example, the first liquid crystal alignment layer 190 may be disposed on the light-shielding spacers 195, on the organic layer 170, and on the pixel electrodes 180, and the second liquid crystal alignment layer 270 may be disposed on the common electrode 250. The liquid crystal layer 300 may be interposed between the first liquid crystal alignment layer 190 and the second liquid crystal alignment layer 270.

The LCD 500 may be implemented as a Polymer Stabilized-Vertical Alignment (PS-VA)-mode LCD. A PS-VA mode, which is a technique to stabilize the pretilt alignment of the liquid crystal compounds 301 via a polymer network including reactive mesogen polymers, may be realized by a first method in which the liquid crystal layer 300 is formed using a liquid crystal composition including reactive mesogens and a polymer network including the polymers of the reactive mesogens is formed through exposure to ultraviolet (UV) light, or a second method in which a liquid crystal alignment agent including the reactive mesogens is applied onto the pixel electrodes 180 and/or the common electrode 250 to form a layer, the reactive mesogens are eluted to the liquid crystal layer 300, and a polymer network including the polymers of the reactive mesogens is formed through exposure to UV light.

A reactive mesogen, which is a compound having a mesogen structure for expressing liquid crystallinity and a polymerizable terminal group, may be represented by the following Formula RM:

P1-SP1-MG-SP2-P2                                Formula RM wherein in Formula RM, each of P1-* and P2-* is independently and P1-* and P2-* may be identical to or different from each other.

In Formula RM,
*—SP1-* may be *—(L-Z-L-Ar—)$_a$L-*, wherein a may be an integer from 0 to 2, and
*—PS2-* may be *-L—(Ar-L-Z-L—)$_b$*, wherein b may be an integer from 0 to 2.

Also, in Formula RM,
*-L-* may be *—(CH$_2$)$_c$—*, *—O(CH$_2$)$_c$—*,

*—CH=CH—*, or *—C≡C—*, wherein c may be an integer from 1 to 10, and
*—Z—* may be *—(CH$_2$)$_d$—*, wherein d may be an integer from 0 to 12.

Also, in Formula RM,
*—Ar—* may be

*-MG-* may be and

A-* may be H—*, $C_{1-10}$ alkyl-*, F—*, Br—*, I—*, *—OH, *—$NH_2$, or CN—*.

The reactive mesogens may include at least one of a compound represented by Formula RM1 and a compound represented by Formula RM2:

Formula RM1

Formula RM2 wherein in Formula RM1 and Formula RM2,
each of $Pm_1$-* and $Pm_2$-* is

, or

$Pm_1$-* and $Pm_2$-* may be identical to or different from each other, and each of $A_1$-* and $A_2$-* is *—H, *—Br, *—OH, *—$NH_2$, or *—CN.

In Formula RM2, *—$Z_1$—* may be *—$(CH_2)_e$—* or *—$O(CH_2)_e$—*, wherein n may be 1 or 2, and e may be 1 to 10.

The compound represented by Formula RM1 has relatively poorer thermal stability than the compound represented by Formula RM2 and may thus easily deteriorate during a high-temperature thermal treatment process for forming the first and second liquid crystal alignment layers 190 and 270. Thus, the compound represented by Formula RM1 may be added, preferably to the liquid crystal composition, during the manufacture of the LCD 500, and the compound represented by Formula RM1 may be added, preferably to the liquid crystal alignment agent, during the manufacture of the LCD 500.

The first and second methods both require a UV exposure process for polymerizing the reactive mesogens. Thus, the liquid crystal layer 300 may be formed using liquid crystal compounds 301 with excellent photostability.

A compound represented by Formula 3 is a low-viscosity liquid crystal compound having excellent properties in terms of rotational viscosity, modulus of elasticity or phase transition temperature ($T_{ni}$), compared to a liquid crystal compound having an alkyl group at a terminal thereof, for example, a liquid crystal compound having an alkyl group, instead of a vinyl group ($CH_2$=$CH$—), in Formula 3, and may thus be commonly used to improve the high-speed response properties of the LCD 500. However, the compound represented by Formula 3 has a highly fragile photostability due to the presence of a double bond at a terminal thereof:

Formula 3 wherein in Formula 3,
*-Cyc-* may be a 1,4-cyclohexylene group,
*-$PheF_2$—* may be a 2,3-difluoro-1,4-phenylene group,
r may be an integer from 0 to 5,
s and t may be integers from 0 to 3,
the sum of s and t may be an integer from 2 to 4, and
*—$R_{31}$ may be a *—$C_{1-5}$ alkyl group or a *—$C_{1-5}$ alkoxy group.

As mentioned above, the counter display substrate SUB2, which is an opposite substrate to the display substrate SUB1, includes the second base substrate 210 and the common electrode 250, which is disposed on the second base substrate 210. The common electrode 210 may be disposed directly on the second base substrate 210. The display substrate SUB1 of the LCD 500 includes the color filter layer 160 and the light-shielding spacers 195, but the counter display substrate SUB2 may not include a color filter layer and a black matrix. In this case, the amount of light incident upon the liquid crystal layer 300 during a UV exposure process increases, compared to a case in which the counter display substrate SUB2 includes a color filter layer and a black matrix. Thus, in a case in which the liquid crystal layer 300 includes the compound represented by Formula 3, the compound represented by Formula 3 may easily deteriorate, and as a result, the Voltage Holding Ratio (VHR) of the LCD 500 may decrease.

For example, the compound represented by Formula 3 may be at least one of compounds represented by Formulas 3-1 through 3-3:

Formula 3-1

Formula 3-2

Formula 3-3 wherein in Formula 3-1 to Formula 3-3, each of X—* and R'—* may be independently $C_{1-5}$ alkyl-*.

The light-shielding spacers 195 may be fabricated using a photosensitizer including a light-shielding material, a binder, a multifunctional monomer, a photoinitiator, and a solvent. For example, the light-shielding material may be a black pigment. For example, the black pigment may be the combination of a blue pigment, a red pigment, and a yellow pigment or may be a lactam-containing black pigment. For example, the blue pigment may be a compound represented by Formula B, the red pigment may be a compound represented by Formula R, the yellow pigment may be a compound represented by Formula Y, and the lactam-containing black pigment may be a compound represented by Formula L:

Formula B

Formula R

Formula Y

Formula L

In Formula L, R—* may be the residue of a $C_{1-10}$ hydrocarbon group or a $C_{1-10}$ hydrocarbon derivative, for example, a carboxylic acid group (—COOH), an epoxy group (—$C_2H_3O$), a styrene group (—$C_8H_7$) etc.

For example, the binder may be a compound represented by Formula BD1 or a compound represented by Formula BD2:

Formula BD1

Formula BD2

In Formula BD1, each of $R_1$—* and $R_2$—* may be independently a $C_{1-10}$ hydrocarbon group or a $C_{1-10}$ hydrocarbon derivative, for example, a carboxylic acid group (—COOH), an epoxy group (—$C_2H_3O$), a styrene group (—$C_8H_7$) etc., and

*—$R_3$—* may be a $C_{1-10}$ alkylene group.

In Formula BD2,

*—$R_4$—* may be a $C_{1-10}$ alkylene group, $R_5$—* may be the residue of a $C_{1-10}$ hydrocarbon group or a $C_{1-10}$ hydrocarbon derivative, for example, a carboxylic acid group (—COOH), an epoxy group (—$C_2H_3O$), a styrene group (—$C_8H_7$) etc., and n may be an integer from 1 to 100.

For example, the light-shielding spacers 195 may be formed by applying the photosensitizer on the display substrate SUB1 or the counter display substrate SUB2 and subjecting the photosensitizer to exposure and development processes. In this case, any unreacted components may infiltrate into the first and second liquid crystal alignment layers 190 and 270, may damage the liquid crystal compounds 301 during a UV exposure process, and may thus cause image sticking. The compound represented by Formula 3, in particular, is vulnerable to the unreacted components. For example, the unreacted components may be the residues of at least one of the light-shielding material and the binder.

Since the unreacted components cannot be completely removed by a rinsing process, the content of the compound represented by Formula 3 in the liquid crystal layer 300 may preferably be minimized. In an embodiment, the liquid crystal layer 300 may not include the compound represented by Formula 3 in the liquid crystal layer 300 at all.

The liquid crystal layer 300 may contain a liquid crystal composition including a first liquid crystal compound represented by Formula 1 and a second liquid crystal compound represented by Formula 2, instead of the compound represented by Formula 3:

Formula 1

Formula 2 wherein in Formula 1 and Formula 2, is a 1,4-phenylene group or a 1,4-cyclohexylene group, each of $R_{11}$—* and $R_{22}$—* is independently $C_{1-10}$ alkyl group-*, each of $L_{11}$-*, $L_{12}$-*, $L_{13}$-*, and $L_{14}$-* of Formula 1 is independently *—F, *—$CF_3$, or *—H, $R_{12}$—* of Formula 1 is a *—$C_{1-5}$ alkoxy group, *—$OCF_3$, *—$CF_3$, or *—F, each of m and n of Formula 1 is independently an integer from 1 to 2, $R_{21}$—* of Formula 2 is $C_{1-5}$ alkyl group-*,

*-$L_{21}$-* of Formula 2 is *—$(CH_2)_i$—CH=CH—$(CH_2)_j$-*, wherein each of i and j of Formula 2 is independently an integer from 0 to 2, and o of Formula 2 is an integer from 1 to 2.

The compound represented by Formula 1 has relatively excellent photostability, compared to the compound represented by Formula 3, because the terminal groups thereof, i.e., $R_{11}$—* and $R_{12}$—*, do not contain any double bond and the core group thereof includes a cyclohexene group. Thus, the compound represented by Formula 1 can improve the VHR of the LCD 500. Also, the compound represented by Formula 1 has low viscosity properties and can thus improve the high-speed response properties of the LCD 500.

Similarly, the compound represented by Formula 2 has excellent photostability, compared to the compound represented by Formula 3, because it does not contain any double bond at the terminals thereof. Thus, the compound represented by Formula 2 can improve the VHR of the LCD 500. Also, the compound represented by Formula 2 has low-viscosity properties and can thus improve the high-speed response properties of the LCD 500.

Table 1 below compares the physical properties of a first liquid crystal compound P-4 that can be represented by Formula 1 and a second liquid crystal compound N-3 that can be represented by Formula 2 with the physical properties of comparative compounds P-1, P-2, P-3, N-1, and N-2.

TABLE 1

| Liquid Crystal Compound | Formula | $T_{ni}$ (° C.) | Δε | Δn | γ1 (mPa·s) |
|---|---|---|---|---|---|
| P-1 |  | 161 | −6.1 | 0.16 | 217 |
| P-2 |  | 173 | −5.9 | 0.15 | 233 |

TABLE 1-continued

| Liquid Crystal Compound | Formula | $T_{ni}$ (° C.) | $\Delta\varepsilon$ | $\Delta n$ | $\gamma 1$ (mPa·s) |
|---|---|---|---|---|---|
| P-3 | C$_3$H$_7$–⬡–⬡–⬡(F,F)–OC$_2$H$_5$ | 184 | −5.9 | 0.10 | 413 |
| P-4 | C$_3$H$_7$–⬡=⬡–⬡(F,F)–OC$_2$H$_5$ | 173 | −5.9 | 0.12 | 235 |
| N-1 | C$_3$H$_7$–⬡–⬡–CH=CH$_2$ | 39 | −1.3 | 0.04 | 16 |
| N-2 | C$_3$H$_7$–⬡–⬡–C$_2$H$_5$ | 16 | −1.1 | 0.05 | 23 |
| N-3 | C$_3$H$_7$–⬡–⬡–CH=CH–CH$_3$ | 81 | −0.5 | 0.07 | 37 |

Figure 3:
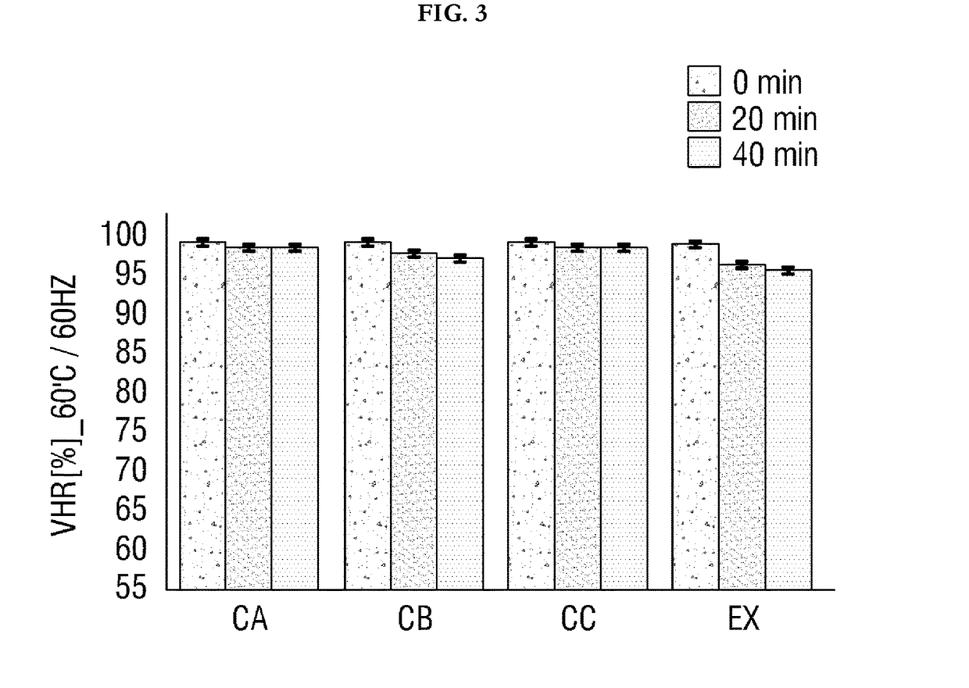
FIGS. 3 and 4 are diagrams comparing the voltage holding ratio (VHR) of a liquid crystal composition according to an exemplary embodiment of the present disclosure with the VHRs of liquid crystal compositions according to comparative examples.
Figure 4:
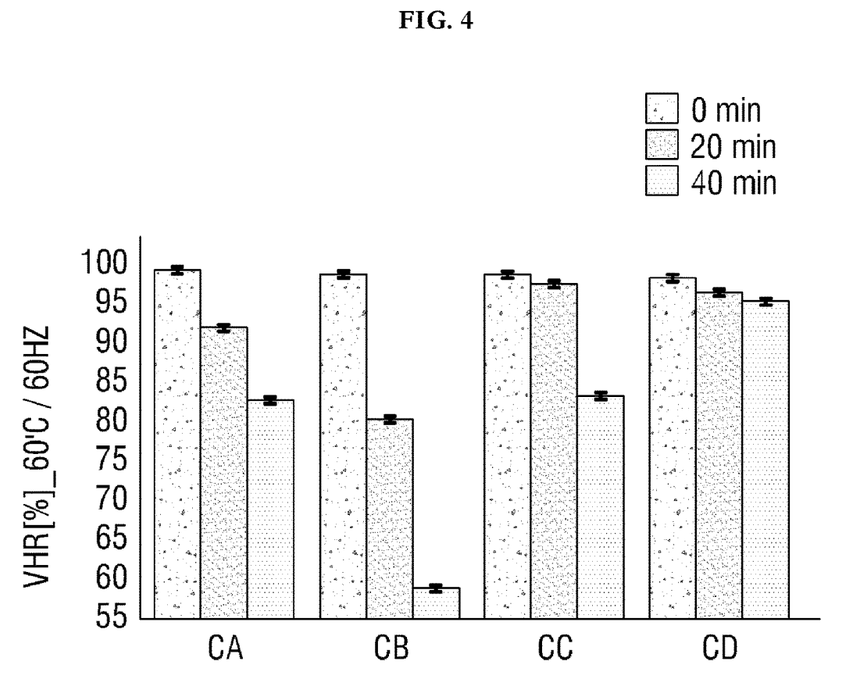

Table 2 below shows the composition ratios of an exemplary liquid crystal composition EX according to the present disclosure and comparative liquid crystal compositions CA, CB, and CC, and FIGS. 3 and 4 are graphs comparing the VHR of the exemplary liquid crystal composition EX with the VHRs of the comparative liquid crystal compositions CA, CB, and CC.

TABLE 2

| Liquid Crystal Compound | CA (wt %) | CB (wt %) | CC (wt %) | EX (wt %) |
|---|---|---|---|---|
| P-2 | 18 | 12 | 11 | 2 |
| P-3 | 15 | 18 | 11 | 16 |
| P-4 | 0 | 0 | 0 | 10 |
| N-1 | 0 | 15 | 0 | 0 |
| N-2 | 22 | 8 | 8 | 0 |
| N-3 | 0 | 9 | 9 | 14 |

FIG. 3 shows VHR measurements obtained from LCD panels, which were fabricated using the comparative liquid crystal compositions CA, CB, and CC and the exemplary liquid crystal composition EX, respectively, to have no light-shielding spacers 195. FIG. 4 shows VHR measurements obtained by applying heat to LCD panels, which were fabricated using the comparative liquid crystal compositions CA, CB, and CC and the exemplary liquid crystal composition EX, respectively, to have the light-shielding spacers 195.

Referring to FIGS. 3 and 4, in the LCD panels with no light-shielding spacers 195, the exemplary liquid crystal composition EX and the comparative liquid crystal compositions CA, CB, and CC all exhibit as high a VHR as about 95% or higher. On the other hand, in the LCD panels with the light-shielding spacers 195, the comparative liquid crystal compositions CA, CB, and CC exhibit only a VHR of about 85% or lower, but the exemplary liquid crystal composition EX exhibits a VHR of about 95% or higher.

Table 3 below compares high-speed response measurements obtained from 48-inch LCD panels fabricated using the comparative liquid crystal compositions CA and CB, respectively, with high-speed response measurements obtained from a 48-inch LCD panel fabricated using the exemplary liquid crystal composition EX.

TABLE 3

| Liquid Crystal Compound | CA (wt %) | CB (wt %) | EX (wt %) |
|---|---|---|---|
| P-2 | 18 | 12 | 2 |
| P-3 | 15 | 18 | 16 |
| P-4 | 0 | 0 | 10 |
| N-1 | 0 | 15 | 0 |
| N-2 | 22 | 8 | 0 |
| N-3 | 0 | 9 | 14 |
| Toff (ms) | 4.5 | 3.5 | 3.5 |
| Ton (ms) | 16.0 | 15.8 | 15.0 |
| Transmittance (%) | 3.60 | 3.55 | 3.56 |

Referring to Table 3, the exemplary liquid crystal composition EX shows high-speed response properties (Toff: 3.5 ms) and may thus be used in a high-speed response LCD panel, for example, in a 120 Hertz (Hz) high-speed response LCD panel.

Referring again to FIGS. 1 and 2, the first base substrate 110 is a base substrate of the switching device 100 and may be provided as a transparent insulating substrate formed of glass or a transparent plastic material.

For example, the switching devices TNT may be thin-film transistors (TFTs), and each of the TFTs may include gate electrodes 125, a gate insulating layer 130, semiconductor layers 140, source electrodes 152, and drain electrodes 155. The gate electrodes 125, which are control terminals of the TFTs, may be disposed on the first base substrate 110 and may be formed of a conductive material. The gate electrodes 125 may be branched off from the gate lines GL. The gate insulating layer 130 may be disposed between the gate electrodes 125 and the semiconductor layers 140 and may insulate the gate electrodes 125 and the semiconductor layers 140 from each other and may be formed to range from the display area I to the non-display area II. The semiconductor layers 140, which are the channel layers of the TFTs, may be disposed on the gate insulating layer 130. The source electrodes 152 and the drain electrodes 155 may be disposed over the semiconductor layers 140 to be isolated from each other and may be formed of a conductive material. The source electrodes 152 are the input terminals of the TFTs, and the drain electrodes 155 are the output terminals of the TFTs. The source electrodes 152 and the drain electrodes 155 may be branched off from the data lines DL. Ohmic contact layers (not illustrated) may be formed between the source electrodes 152 and the semiconductor layers 140 and between the drain electrodes 155 and the semiconductor layers 140.

The gate lines GL may be disposed between the first base substrate 110 and the pixel electrodes 180, and the data lines DL may be disposed between the gate lines GL and the pixel electrodes 180.

The color filter layer 160 may be disposed on the source electrodes 152 and on the drain electrodes 155. The color filter layer 160 may be disposed on the switching devices TNT, for example, between the switching devices TNT and the pixel electrodes 180. The color filter layer 160 may be formed in a region corresponding to each of the pixels PX in the display area I and may include a first color filter 160-1 and a second color filter 160-2. For example, the first color filter 160-1 and the second color filter 160-2 may be color filters realizing different colors. For example, each of the first color filter 160-1 and the second color filter 160-2 may be independently one of a red color filter R, a green color filter G, and a blue color filter B. The first color filter 160-1 and the second color filter 160-2 may be alternately arranged.

The organic layer 170 may be formed on the color filter layer 160 and may include an organic material. The organic layer 170 may also be formed in the non-display area II.

The pixel electrodes 180 may be formed on the organic layer 170 for the pixels PX, respectively, and may include a conductive material. The pixel electrodes 180 may be electrically connected to the drain electrode 155 via contact holes 172, which penetrate the color filter layer 160 and the organic layer 170. The switching devices TFT are electrically connected to the gate lines GL and the pixel electrodes 180. The pixel electrodes 180 may be formed of indium tin oxide (ITO), indium zinc oxide (IZO), indium oxide, zinc oxide, tin oxide, gallium oxide, titanium oxide, aluminum (Al), silver (Ag), platinum (Pt), chromium (Cr), molybdenum (Mo), tantalum (Ta), niobium (Nb), zinc (Zn), magnesium (Mg), or an alloy or a lamination film thereof. The pixel electrodes 180 may be disposed between the color filter layer 160 and liquid crystal layer 300.

The pixel electrodes 180 may form an electric field together with the common electrode 250 and may thus control the alignment direction of the liquid crystal compounds 301. The pixel electrodes 180 may be pattern electrodes having at least one of a protrusion pattern and a slit pattern or may be patternless electrodes.

The light-shielding spacers 195 may be disposed on the display substrate SUB1. The light-shielding spacers 195 may be disposed between the display substrate SUB1 and the counter display substrate SUB2. For example, the light-shielding spacers 195 may be disposed on the organic layer 170 and on the pixel electrodes 180. The light-shielding spacers 195 may have portions disposed between the organic layer 170 and the liquid crystal layer 300 and portions disposed between the pixel electrodes 180 and the liquid crystal layer 300. The light-shielding spacers 195 may have areas of overlap with the switching devices TFT.

The light-shielding spacers 195 may be formed of an elastic material. For example, the light-shielding spacers 195 may include main spacers 195M and sub-spacers 195S. The main spacers 195M are formed to be higher than the sub-spacers 195S and may maintain the thickness of the liquid crystal layer 300 even in case external force is applied to the LCD 500. The sub-spacers 195S may absorb external force applied to the main spacers 195M and may thus prevent the elasticity of the main spacers 195M from being broken by the external force. For example, the difference between a thickness t1 of the main spacers 195M and a thickness t2 of the sub-spacers 195S, i.e., t1−t2, may be 0.25 micrometers (μm) to 0.8 μm. For example, if the thickness t1 of the main spacers 195M is 3 μm, the thickness t2 of the sub-spacers 195S may be 2.5 μm.

The first liquid crystal alignment layer 190 may be disposed on the display substrate SUB1 and on the light-shielding spacers 195. The first liquid crystal alignment layer 190 may have portions disposed between the pixel electrodes 180 and the liquid crystal layer 300, portions disposed between the light-shielding spacers 195 and the liquid crystal layer 300, and portions disposed between the light-shielding spacers 195 and the second liquid crystal alignment layer 270. The first liquid crystal alignment layer 190 may be formed not only in the display area I, but also in the non-display area II. The first liquid crystal alignment layer 190 may include a polymer network including the polymers of the reactive mesogens, for example, a polymer network including the polymers of reactive mesogens represented by Formula RM1 and/or the polymers of reactive mesogens represented by Formula RM2.

The polymer network of the first liquid crystal alignment layer 190 may allow the liquid crystal compounds 301 to be aligned with a predetermined pretilt angle with respect to the display substrate SUB1 and the counter display substrate SUB2 even in the absence of an electric field in the LCD 500. The term "pretilt angle", as used herein, denotes the angle of the directors of the liquid crystal compounds 301 with respect to the display substrate SUB1 or the angle of the directors of the liquid crystal compounds 301 with respect to the counter display substrate SUB2.

Although not illustrated in the drawings, the first liquid crystal alignment layer 190 may include a polyimide-containing alignment base layer and a polymer network including the polymers of the reactive mesogens and may further include an alignment stabilization layer, which is formed on the polyimide-containing alignment base layer. The polyimide-containing alignment base layer may not be provided, and the first liquid crystal alignment layer 190 is not particularly limited to including both the polyimide-containing alignment base layer and the alignment stabilization layer.

The second base substrate 210 is a base substrate of the counter display substrate SUB2 and may be provided as a transparent insulating substrate formed of glass or a transparent plastic material.

The common electrode 250 may be disposed directly on the second base substrate 210. The common electrode 250 may be a pattern electrode having at least one of a protrusion pattern and a slit pattern or may be a patternless electrode. The common electrode 250 may be formed of ITO, IZO, indium oxide, zinc oxide, tin oxide, gallium oxide, titanium oxide, Al, Ag, Pt, Cr, Mo, Ta, Nb, Zn, Mg, or an alloy or a lamination film thereof.

The second liquid crystal alignment layer 270 may be disposed directly on the common electrode 250. The second liquid crystal alignment layer 270 may have portions disposed between the common electrode 250 and the liquid crystal layer 300 and portions disposed between the common electrode 250 and the first liquid crystal alignment layer 190. The second liquid crystal alignment layer 270 may be formed not only in the display area I, but also in the non-display area II. The second liquid crystal alignment layer 270 may include a polymer network including the polymers of the reactive mesogens, for example, a polymer network including the polymers of reactive mesogens represented by Formula RM1 and/or the polymers of reactive mesogens represented by Formula RM2.

The polymer network of the second liquid crystal alignment layer 270 may allow the liquid crystal compounds 301 to be aligned with a predetermined pretilt angle with respect to the display substrate SUB1 and the counter display substrate SUB2 even in the absence of an electric field in the LCD 500. The term "pretilt angle", as used herein, denotes the angle of the directors of the liquid crystal compounds 301 with respect to the display substrate SUB1 or the angle of the directors of the liquid crystal compounds 301 with respect to the counter display substrate SUB2.

Although not illustrated in the drawings, the second liquid crystal alignment layer 270 may include a polyimide-containing alignment base layer and a polymer network including the polymers of the reactive mesogens and may further include an alignment stabilization layer, which is formed on the polyimide-containing alignment base layer. The polyimide-containing alignment base layer may not be provided, and the second liquid crystal alignment layer 270 is not particularly limited to including both the polyimide-containing alignment base layer and the alignment stabilization layer.

Although not illustrated in the drawings, the LCD 500 may further include a backlight assembly (not illustrated), which is disposed on the back of the display substrate SUB1, and which provides light to the liquid crystal layer 300.

For example, the backlight assembly may include a light guide plate (LGP), a light source unit, a reflective member, and one or more optical sheets.

The LGP, which changes the path of light generated by the light source unit so as for the light to travel toward the liquid crystal layer 300, may include an incidence surface, which is provided to receive the light generated by the light source unit, and an emission surface, which faces the liquid crystal layer 300. The LGP may be formed of a material with a uniform refractive index, such as polymethyl methacrylate (PMMA) or polycarbonate (PC), but the present disclosure is not limited thereto.

Light incident upon one or both sides of the LGP may have a smaller incidence angle than the critical angle of the LGP, and may thus enter the LGP. On the other hand, light incident upon the top or bottom surface of the LGP may have a greater incidence angle than the critical angle of the LGP, and may thus be evenly distributed throughout the LGP, instead of being emitted out of the LGP.

A diffusion pattern may be formed on one of the top and bottom surfaces of the LGP, for example, the bottom surface of the LGP that is opposite to the emission surface of the LGP, so as for guided light to be emitted upwards. For example, in order for light transmitted within the LGP to be emitted upward, the diffusion pattern may be printed on one surface of the LGP with ink, but the present disclosure is not limited thereto. That is, an array of fine grooves or protrusions may be formed on the LGP as the diffusion pattern, or various other modifications may be made to the diffusion pattern without departing from the scope of the present disclosure.

The reflective member (not illustrated) may be additionally provided between the LGP and a lower receiving member (not illustrated). The reflective member reflects light emitted from the bottom surface of the LGP, which is opposite to, and faces, the emission surface of the LGP, and thus applies the light back to the LGP. The reflective member may be formed as a film, but the present disclosure is not limited thereto.

The light source unit may be disposed to face the incidence surface of the LGP. The number of light source units provided may be varied as needed. For example, only one light source unit may be provided on one side of the LGP. Alternatively, three or more light source units may be provided to correspond to three or more sides of the LGP. Still alternatively, a plurality of light source units may be provided to correspond to only one side of the LGP. The backlight assembly has been described above, taking as an example a side light-type backlight assembly in which one or more light source units are provided on one or more sides of an LGP, but the present disclosure is not limited thereto. That is, the present disclosure is also applicable to a direct-type backlight assembly or another light source device, such as a surface-type light source device.

The light source unit may include a white light-emitting diode (LED), which emits white light, or a plurality of LEDs, which emit red light, green light and blue light. In response to the light source unit including a plurality of LEDs, which emit red light, green light, and blue light, white light may be realized by turning on all the LEDs to mix the red light, the green light, and the blue light together.

While exemplary embodiments have been shown and described above, it will be apparent to those skilled in the art that modifications and variations could be made without departing from the spirit and scope of the disclosure as defined by the appended claims. The exemplary embodiments should be considered in a descriptive sense only and not for purposes of limitation.

What is claimed is:

1. A liquid crystal display device, comprising:
   a display substrate comprising a first base substrate, a switching device disposed on the first base substrate, a color filter layer disposed on the switching device, and a first electrode disposed on the color filter layer;
   a counter display substrate comprising a second base substrate and a second electrode disposed on the second base substrate and facing the first electrode, wherein the counter display substrate is disposed separately from and facing the display substrate;
   a liquid crystal layer disposed between the display substrate and the counter display substrate, wherein the liquid crystal layer comprises at least one first liquid crystal compound represented by Formula 1 and at least one second liquid crystal compound represented by Formula 2; and
   a light-shielding spacer disposed between the display substrate and the counter display substrate,

Formula 1

Formula 2 wherein in Formula 1 and Formula 2, is a 1,4-phenylene group or a 1,4-cyclohexylene group, and
each of $R_{11}$—* and $R_{22}$—* is independently $C_{1-10}$ alkyl group-*,
wherein in Formula 1,
each of $L_{11}$-*, $L_{12}$-*, $L_{13}$-*, and $L_{14}$-* is independently *—F, *—$CF_3$, or *—H,
$R_{12}$—* is a *—$C_{1-5}$ alkoxy group, *—$OCF_3$, *—$CF_3$, or *—F,
each of m and n is independently an integer from 1 to 2,
wherein in Formula 2,
$R_{21}$—* is $C_{1-5}$ alkyl group-*,
*-$L_{21}$-* is *—$(CH_2)_i$—CH=CH—$(CH_2)_j$—*, wherein each of i and j is independently an integer from 0 to 2, and
o is an integer from 1 to 2.

2. The liquid crystal display device of claim 1, wherein the liquid crystal layer does not comprise at least one third liquid crystal compound represented by Formula 3:

$$CH_2=CH-(CH_2)_r\text{-}(Cyc)_s\text{-}(PheF_2)_t-R_{31}$$ Formula 3 wherein in Formula 3,
*-Cyc-* is a 1,4-cyclohexylene group,
*-$PheF_2$—* is a 2,3-fluoro-1,4-phenylene group,
r is an integer from 0 to 5,
each of s and t are integers from 0 to 3,
the sum of s and t is an integer from 2 to 4, and
*—$R_{31}$ is a *—$C_{1-5}$ alkyl group or a *—$C_{1-5}$ alkoxy group.

3. The liquid crystal display device of claim 2, wherein the at least one third liquid crystal compound is represented by Formulas 3-1 through 3-3:

Formula 3-1

Formula 3-2

Formula 3-3 wherein in Formula 3-1 to Formula 3-3, each of X—* and R'—* is independently $C_{1-5}$ alkyl-*.

4. The liquid crystal display device of claim 1, wherein the liquid crystal layer further comprises reactive mesogens represented by Formula RM:

$$P1\text{-}SP1\text{-}MG\text{-}SP2\text{-}P2$$ Formula RM wherein in Formula RM,
each of P1-* and P2-* is independently

*—SP1-* is *—[L-Z-L-Ar]$_a$L-*, wherein a is an integer from 0 to 2,
*—PS2-* is *-L-[Ar-L-Z-L]$_b$*, wherein b is an integer from 0 to 2,
*-L-* is *—$(CH_2)_c$—*, *—$O(CH_2)_c$—*,

*—CH=CH—*, or *—C≡C—*,
*—Z—* is *—$(CH_2)_c$—*, wherein c is an integer from 0 to 12,
*—Ar—* is -continued

*-MG-* is and
A-* is H—*, $C_{1-10}$ alkyl-*, F—*, Br—*, I—*, *—OH, *—$NH_2$ or CN—*.

5. The liquid crystal display device of claim 4, wherein the reactive mesogens comprise at least one of a compound represented by Formula RM1 and a compound represented by Formula RM2:

Formula RM1

Formula RM2 wherein in Formula RM1 and Formula RM2,
each of $Pm_1$-* and $Pm_2$-* is

-continued each of $A_1$-* and $A_2$-* is *—H, *—F, *—Br, *—I, *—OH, *—$NH_2$, or *—CN,
*—$Z_1$—* is *—$(CH_2)_e$—* or *—$O(CH_2)_e$—*, wherein e is an integer from 1 to 10, and
n is an integer from 1 or 2.

6. The liquid crystal display device of claim 1, wherein the first liquid crystal compound is represented by Formula P-4 and wherein the second liquid crystal compound is represented by Formula N-3:

Formula P-4

Formula N-3

7. The liquid crystal display device of claim 4, further comprising:
a first liquid crystal alignment layer disposed between the first electrode and the liquid crystal layer; and
a second liquid crystal alignment layer disposed between the second electrode and the liquid crystal layer,
wherein at least one of the first liquid crystal alignment layer and the second liquid crystal alignment layer comprises polymers of the reactive mesogens.

8. The liquid crystal display device of claim 1, wherein a content of the at least one first liquid crystal compound in a liquid crystal composition is about 0.5 weight percent to about 15 weight percent.

9. The liquid crystal display device of claim 8, wherein the content of the at least one second liquid crystal compound in the liquid crystal composition is about 1 weight percent to about 30 weight percent.

10. The liquid crystal display device of claim 1, wherein the light-shielding spacer has an area of overlap with the switching device.

11. The liquid crystal display device of claim 1, wherein the light-shielding spacer has an optical density of about 1 or greater per film thickness of 1 micrometer at a wavelength of 200 nanometers to 800 nanometers.

12. The liquid crystal display device of claim 1, wherein the light-shielding spacer comprises a light-shielding material and a binder.

13. The liquid crystal display device of claim 12, wherein the light-shielding material is a combination of a blue pigment represented by Formula B, a red pigment represented by Formula R, and a yellow pigment represented by Formula Y:

Formula B

Formula R

Formula Y

14. The liquid crystal display device of claim 12, wherein the light-shielding material is a lactam-containing black pigment represented by Formula L:

Formula L wherein in Formula L, R—* is a $C_{1-10}$ hydrocarbon group.

15. The liquid crystal display device of claim 12, wherein the binder is represented by Formula BD1 or Formula BD2:

Formula BD1

Formula BD2 wherein in Formula BD1,
each of $R_1$—* and $R_2$—* is independently a $C_{1-10}$ hydrocarbon group, and
*—$R_3$—* is a $C_{1-10}$ alkylene group, and
wherein in Formula BD2,
*—$R_4$—* is a $C_{1-10}$ alkylene group,
$R_5$—* is a $C_{1-10}$ hydrocarbon group, and
n is an integer from 1 to 100.

* * * * *